United States Patent
Chang et al.

(10) Patent No.: US 11,430,989 B2
(45) Date of Patent: Aug. 30, 2022

(54) ACTIVE MATERIAL OF ANODE OF LITHIUM-ION BATTERY, ANODE OF LITHIUM-ION BATTERY AND LITHIUM-ION BATTERY

(71) Applicant: Daxin Materials Corporation, Taichung (TW)

(72) Inventors: Jui-Shen Chang, Taichung (TW); Yun-Shan Lo, Taichung (TW); Kuo-Cheng Huang, Taichung (TW)

(73) Assignee: Daxin Materials Corporation, Taichung (TW)

( * ) Notice: Subject to any disclaimer, the term of this patent is extended or adjusted under 35 U.S.C. 154(b) by 223 days.

(21) Appl. No.: 16/720,004

(22) Filed: Dec. 19, 2019

(65) Prior Publication Data

US 2020/0395609 A1    Dec. 17, 2020

(30) Foreign Application Priority Data

Jun. 12, 2019  (TW) ................. 108120354

(51) Int. Cl.
*H01M 4/38* (2006.01)
*H01M 10/0525* (2010.01)
*H01M 4/42* (2006.01)

(52) U.S. Cl.
CPC ........... *H01M 4/386* (2013.01); *H01M 4/387* (2013.01); *H01M 4/42* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2007/0122702 A1* | 5/2007 | Sung | ....... | H01M 4/46 429/218.1 |
| 2010/0112442 A1* | 5/2010 | Fujikawa | ....... | H01G 11/26 429/218.1 |
| 2014/0050975 A1* | 2/2014 | Cha | ....... | H01M 4/624 429/209 |
| 2018/0026301 A1* | 1/2018 | Ebisuzaki | ....... | H01M 10/0481 429/245 |

FOREIGN PATENT DOCUMENTS

| | | |
|---|---|---|
| CN | 101584076 A | 11/2009 |
| CN | 102136602 A | 7/2011 |
| CN | 103999270 A | 8/2014 |
| KR | 20170042115 A | 4/2017 |
| WO | 2016121320 A1 | 8/2016 |

OTHER PUBLICATIONS

The article titled "Brass" on wikipedia.org https://en.wikipedia.org/wiki/Brass (Year: 2021).*
Xue-Lin Yang et al., "Synthesis of Si/Sn Binary Lithium-storage Host Composite Anode Materials by in-situ Mechanochemical Reaction", Chinese Journal of Inorganic Chemistry, published in Aug. 2008, vol. 24, No. 3, pp. 1320-1324, published by Chinese Chemical Society, China, P.R.C.

* cited by examiner

Primary Examiner — Zhongqing Wei
(74) Attorney, Agent, or Firm — CKC & Partners Co., LLC

(57) ABSTRACT

An anode active material of a lithium-ion battery is provided. The active material of the anode of the lithium-ion battery includes silicon, tin and copper-zinc alloy, in which tin is substantially in an elemental state. Moreover, an anode of a lithium-ion battery is provided. The anode of the lithium-ion battery includes the active material as mentioned above.

13 Claims, 7 Drawing Sheets

# ACTIVE MATERIAL OF ANODE OF LITHIUM-ION BATTERY, ANODE OF LITHIUM-ION BATTERY AND LITHIUM-ION BATTERY

CROSS-REFERENCE TO RELATED APPLICATION

This application claims priority to Taiwan Application Serial Number 108120354, filed on Jun. 12, 2019, which is herein incorporated by reference.

BACKGROUND

Field of Invention

The present invention relates to an anode active material of a lithium-ion battery, an anode of a lithium-ion battery, and a lithium-ion battery.

Description of Related Art

Lithium-ion batteries have emerged from others in recent years. Lithium-ion batteries are advantageous in high energy density, low self-discharge, long cycle life, no memory effect, and little environmental pollution.

Among a variety of anode materials applied in lithium-ion batteries, more and more batteries have adopted silicon-based materials as anode material because silicon provides a relatively higher specific capacity. However, in the conventional lithium-ion battery equipped with a silicon-based anode, the volume thereof is prone to be considerably changed during charging and discharging periods, thereby leading to the fracture of the construction of the batteries. Accordingly, the duration lifetime and safety of the battery are undesirably deteriorated. Therefore, there is a need for a solution that can improve the issue of volume change mentioned above.

SUMMARY

According to one aspect of the present invention, an anode active material of a lithium-ion battery is provided. The anode active material of the lithium-ion battery includes silicon, tin and copper-zinc alloy, in which the tin is substantially in an elemental state.

According to one or more embodiments of the present invention, based on a total moles of silicon, tin, copper, and zinc, and a molar ratio of silicon is in a range of from 45% to 90%, a molar ratio of tin is in a range of from 4% to 45%, a molar ratio of copper is in a range of from 3% to 20%, and a molar ratio of zinc is in a range of from 3% to 20%.

According to one or more embodiments of the present invention, the anode active material of the lithium-ion battery excludes tin alloy.

According to one or more embodiments of the present invention, the anode active material of the lithium-ion battery excludes copper-tin alloy.

According to one or more embodiments of the present invention, a specific surface area of the anode active material of the lithium-ion battery is less than 10 m$^2$/g.

According to one or more embodiments of the present invention, the copper-zinc alloy includes at least one alloy phase of β phase, β' phase, γ phase, ε phase, β+γ phase, β'+γ phase, and ε+γ phase.

According to one or more embodiments of the present invention, an atomic ratio of zinc (Zn) to copper (Cu) in the copper-zinc alloy is in a range of from 1.03 to 4.

According to one or more embodiments of the present invention, the anode active material of the lithium-ion battery has a secondary particle size in a range of from 2 to 10 μm.

According to another aspect of the present invention, an anode of a lithium-ion battery is provided. The anode of the lithium-ion battery includes the anode active material of the lithium-ion battery described in any embodiments described in the present disclosure.

According to one or more embodiments of the present invention, the anode of the lithium-ion battery further includes a conductive material and an adhesive.

According to one or more embodiments of the present invention, the adhesive includes at least one polymer, copolymer or mixture of polyvinylidene difluoride (PVDF), styrene-butadiene rubber latex (SBR), carboxymethyl cellulose (CMC), polyacrylate (PAA), polyacrylonitrile (PAN), polyvinyl alcohol (PVA) and sodium alginate.

Another aspect of the present invention is to provide a lithium-ion battery, which includes the anode of the lithium-ion battery described in the present disclosure.

According to one or more embodiments of the present invention, the lithium-ion battery further includes a cathode of the lithium-ion battery and an electrolyte. The electrolyte is disposed between the anode of the lithium-ion battery and the cathode of the lithium-ion battery.

BRIEF DESCRIPTION OF THE DRAWINGS

In order to make the above and other objects, features, advantages and embodiments can be more fully understood, detailed description of the accompanying drawings as follows.

DETAILED DESCRIPTION

Figure 1:
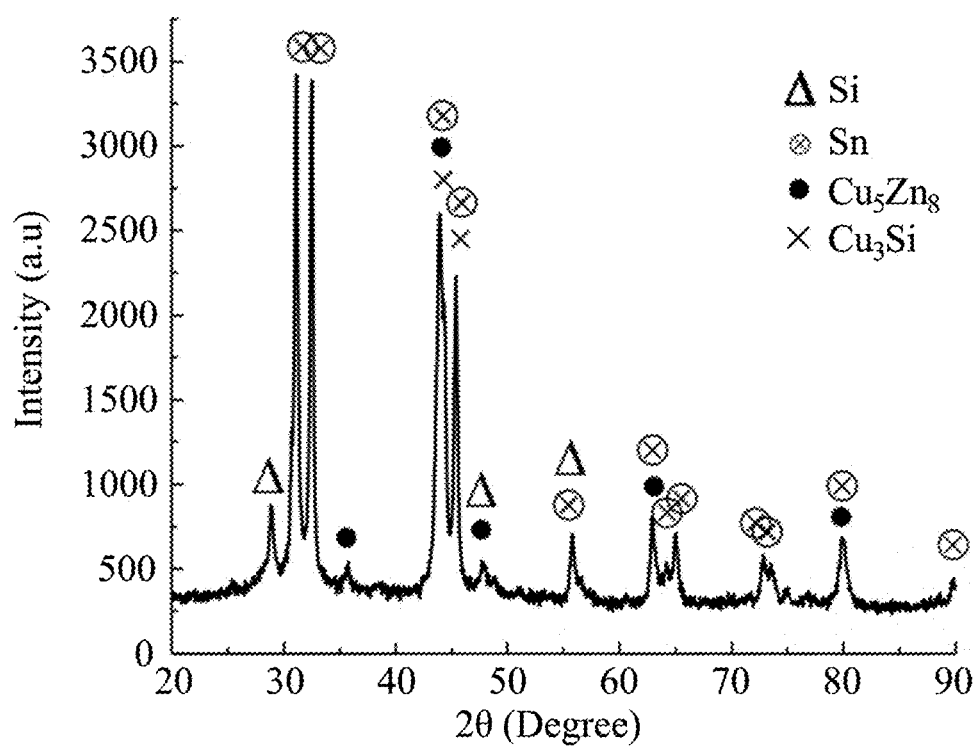
FIG. 1 is an X-ray diffraction pattern of an anode active material of a lithium-ion battery according to Embodiment 1 of the present invention.

In order to make the description of the present invention more detailed and complete, reference is made to the accompanying drawings and the various embodiments or examples described below.

The singular term used herein includes plural referents unless the context clearly dictates otherwise. By reference to a specific reference to "an embodiment", at least one of embodiments of the present invention shows a particular feature, structure or characteristic, such that when a specific reference is made, it is not necessary to refer to the same embodiment, and further, in one or more embodiments, these particular features, structures, or characteristics may be combined with each other as appropriate.

In the conventional lithium-ion battery equipped with silicon-based anode, the volume thereof is prone to be considerably extended or shrunk during charging and discharging the battery, resulting in the fracture of the construction of the battery. Accordingly, the duration lifetime and safety of the battery are undesirably deteriorated.

The present invention provides an anode active material of a lithium-ion battery, which includes silicon, tin and copper-zinc alloy. It is to be noted that tin in the anode active material of the lithium-ion battery of the present invention is substantially in an elemental state. The term "substantially in the elemental state" used herein is intended to exclude an ingredient of tin at non-zero valence state intentionally added or processed.

In some embodiments, tin in the elemental state can adhere silicon to copper-zinc alloy, so tin may be used as an adhesive, so that the components of the anode active material of the lithium-ion battery (e.g., silicon and copper-zinc alloy) can be more tightly adhered. In addition, since the ductile tin is disposed between silicon and copper-zinc alloy, tin can also serve as a buffer for volume change of silicon during charging and discharging the battery, thereby avoiding broken of the battery structure due to the volume change of silicon.

In some embodiments, in the anode active material of the lithium-ion battery, based on a total moles of silicon, tin, copper and zinc is 100%, a molar ratio of silicon is in a range of from 45% to 90%, such as 50%, 55%, 60%, 65%, 70%, 75%, 80% or 85%, preferably in a range of from 65% to 90%. A molar ratio of tin is in a range of from 4% to 45%, such as 5%, 10%, 15%, 20%, 25%, 30%, 35% or 40%, preferably in a range of from 4% to 25%. A molar ratio of copper is in a range of from 3% to 20%, such as 5%, 10% or 15%, preferably in a range of from 3% to 15%. A molar ratio of zinc is in a range of from 3% to 20%, such as 5%, 10% or 15%, preferably in a range of from 3% to 15%. In another embodiment, the molar ratio of silicon is in a range of from 60% to 75%, and the molar ratio of tin is in a range of from 10% to 20%, and the molar ratio of copper is in a range of from 5% to 10%, and the molar ratio of zinc is in a range of from 5% to 10%.

When the molar ratio of silicon is in a range of from 45% to 90%, and the molar ratio of tin is in a range of from 4% to 45%, and the molar ratio of copper is in a range of from 3% to 20%, and the molar ratio of zinc is in a range of from 3% to 20%, a specific capacitance of the anode active material of the lithium-ion battery can reach 1100 mAh/g or more. Further, when the molar ratio of silicon is in a range of from 65% to 90%, and the molar ratio of tin is in a range of from 4% to 25%, and the molar ratio of copper is in a range of from 3% to 15%, and the molar ratio of zinc is in a range of from 3% to 15%, a specific capacitance of the anode active material of the lithium-ion battery can reach 1500 mAh/g or more.

In some embodiments, if the content of tin is too small, for example, the molar ratio is less than 4%, the buffering effect of the volume change of silicon described above is greatly reduced, so that the structure of the anode of the lithium-ion battery is easier broken during charging and discharging. In some embodiments, if the content of tin is too large, for example, the molar ratio is greater than 45%, the molar ratio of silicon is reduced, thereby affecting the specific capacitance of the anode active material of the lithium-ion battery.

In some embodiments, as described above, tin of the present invention is substantially in the elemental state, and thus the anode active material of the lithium-ion battery of the present invention substantially excludes tin alloy. The term "substantially excludes tin alloy" used herein is intended to exclude an ingredient of tin alloy intentionally added or processed. In a further embodiment, the anode active material of the lithium-ion battery of the present invention excludes copper-tin alloy.

Specifically, the copper-zinc alloy in the anode active material of the lithium-ion battery includes at least one alloy phase of β phase, β' phase, γ phase, ε phase, β+γ phase, β'+γ phase, and ε+γ phase. In some embodiments, copper-zinc alloy includes β' phase. In other embodiments, copper-zinc alloy includes β'+γ phase.

Further, in some embodiments, an atomic ratio of zinc (Zn) to copper (Cu) in the copper-zinc alloy of the anode active material of the lithium-ion battery is in a range of from 1.03 to 4, for example, in a range of from 1.03 to 2.15, preferably in a range of from 1.03 to 1.50, more preferably in a range of from 1.03 to 1.05.

In copper-zinc alloy, when the atomic ratio of zinc to copper is in a range of from 1.03 to 4, copper-zinc alloy is mainly β' phase, β'+γ phase, γ phase, and ε+γ phase. When the atomic ratio of zinc to copper is in a range of from 1.03 to 2.15, copper-zinc alloy is mainly β' phase, β'+γ phase an γ phase. When the atomic ratio of zinc to copper is in a range of from 1.03 to 1.50, copper-zinc alloy is mainly β' phase and β'+γ phase. When the atomic ratio of zinc to copper is in a range of from 1.03 to 1.05, copper-zinc alloy is mainly β' phase.

In some embodiments, a specific surface area of the anode active material of the lithium-ion battery is less than 10 $m^2/g$, such as less than 8 $m^2/g$, 5 $m^2/g$, or 3 $m^2/g$. The specific surface area of the active material of the electrode is closely related to the amount of the adhesive used. If the specific surface area of the active material is too large, more adhesive is required, thereby reducing the proportion of the active material in the electrode, resulting in a decrease in the capacitance of the electrode. Therefore, the anode active material of the lithium-ion battery of the present invention not only has an excellent specific capacitance, but also can be blended with a high ratio when the electrode is formed, so that the capacitance of the electrode can be increased.

In certain embodiments, the primary particle size of the anode active material of the lithium-ion battery after high energy ball milling is in a range of from 200 nm to 500 nm, such as 300 nm or 400 nm. The secondary particle size of the anode active material of the lithium-ion battery is in a range of from 0.8 to 50 μm, preferably in a range of from 1 to 25 μm, more preferably in a range of from 2 to 10 μm, such as 4 μm, 6 μm or 8 μm. A too large primary particle size or secondary particle size results in a smaller overall reaction area of the anode active material of the lithium-ion battery, so that a maximum current that the anode of the lithium-ion battery can withstand is also small. A too small primary particle size or secondary particle size may cause the anode active material of the lithium-ion battery to require more adhesive to adhere, thereby reducing the proportion of the active material in the electrode, and thus reducing the capacitance of the electrode.

The anode active material of the lithium-ion battery of the present invention may be formed using the high energy ball milling method. In detail, silicon, tin, copper and zinc in the elemental state are mixed in a ball mill tank, and the high energy ball milling method causes the powder and grinding balls (e.g., zirconium balls) to rub against each other to generate heat, and the temperature in the ball mill tank can be reached at 300° C. Therefore, copper and zinc form copper-zinc alloy during ball milling. In addition, during the ball milling process, high temperature causes a portion of tin to melt, thereby adhering silicon to copper-zinc alloy.

However, if only silicon and nickel, or silicon and copper are mixed, a part of silicon is consumed due to formation of an intermetallic compound of silicon-nickel, or silicon-copper, and a specific capacitance of the active material is thus reduced. Furthermore, if only silicon, tin, nickel, or silicon, tin, copper are mixed, a part of silicon is consumed due to formation of an intermetallic compound of silicon-tin-nickel or silicon-tin-copper. If only silicon, tin and zinc are mixed, eutectic phenomenon between tin and zinc will occur, and eutectic alloy with lower melting point will be cold welded onto the ball mill tank and the grinding balls, resulting in loss of the active material and a significant decrease of service life of the grinding balls.

Since zinc preferentially forms copper-zinc alloy with copper, in the present invention, eutectic phenomenon between tin and zinc described in the preceding paragraph will not occur and the intermetallic compound of silicon-tin-copper will not be formed. In addition, copper forms $Cu_3Si$ with silicon, causing additional capacitance loss. However, if zinc is added, copper preferentially forms copper-zinc alloy with zinc, so that formation of copper-silicon alloy can be reduced to maintain high energy capacitance. Furthermore, nickel forms alloy such as $NiSi_2$ or $NiSi$ with silicon, which reduces more energy capacitance than the above-mentioned copper-silicon alloy. In summary, copper-zinc alloy of the present invention can avoid the alloying of silicon with other metals and maintain high specific capacitance.

The present invention provides the anode active material of the lithium-ion battery, which optionally includes a carbonaceous material capable of providing a carbon source or a ceramic material to increase the cycle life of the lithium-ion battery or the structural stability of the anode material, in which the aforementioned carbonaceous material includes structured carbon or amorphous carbon, such as but not limited to carbon black, activated carbon, graphite, graphene, carbon nanotubes, carbon fiber. Such carbonaceous materials can be high energy ball milled with silicon, tin, copper and zinc to form a composite active material, or silicon, tin, copper and zinc can be energy ball milled, and then milder grinded and mixed with the carbonaceous material to form a carbon-covered structure on surfaces of the formed particles; the ceramic material may be but not limited to, silicon dioxide, titanium dioxide, aluminum oxide, iron oxide, silicon carbide or tungsten carbide.

The present invention also provides an anode of a lithium-ion battery, which includes the above-mentioned anode active material of the lithium-ion battery. In some embodiments, the anode of the lithium-ion battery further includes a conductive material and an adhesive, and the anode active material of the lithium-ion battery is adhered to the conductive material through the adhesive.

In some embodiments, the conductive material may be, for example, SUPER-P, KS-6, Ketjen black, conductive graphite, carbon nanotubes, graphene or vapor grown carbon fiber (VGCF). In certain embodiments, the conductive material has a weight ratio in a range of from 5 to 20% based on 100% of the anode of the lithium-ion battery, more preferably in a range of from 15 to 20%, such as 16%, 17%, 18%, or 19%.

In some embodiments, the adhesive includes at least one polymer, copolymer, or mixture of polyvinylidene difluoride (PVDF), styrene-butadiene rubber latex (SBR), carboxymethyl cellulose (CMC), polyacrylate (PAA), polyacrylonitrile (PAN), polyvinyl alcohol (PVA) and sodium alginate.

In addition, the present invention also provides a lithium-ion battery including the above-mentioned anode of the lithium-ion battery. In some embodiments, the lithium-ion battery further includes a cathode of the lithium-ion battery and an electrolyte, in which the electrolyte is disposed between the anode of the lithium-ion battery and the cathode of the lithium-ion battery.

Please refer to FIG. 1, which is an X-ray diffraction pattern of an anode active material of a lithium-ion battery according to Embodiment 1 of the present invention. In Embodiment 1, silicon, tin, copper and zinc in the elemental state were mixed using high energy ball milling. As shown in FIG. 1, it was found that the anode active material of the lithium-ion battery of the present invention did contain copper-zinc alloy, and tin was substantially in the elemental state, and excluded tin alloy.

Figure 2:
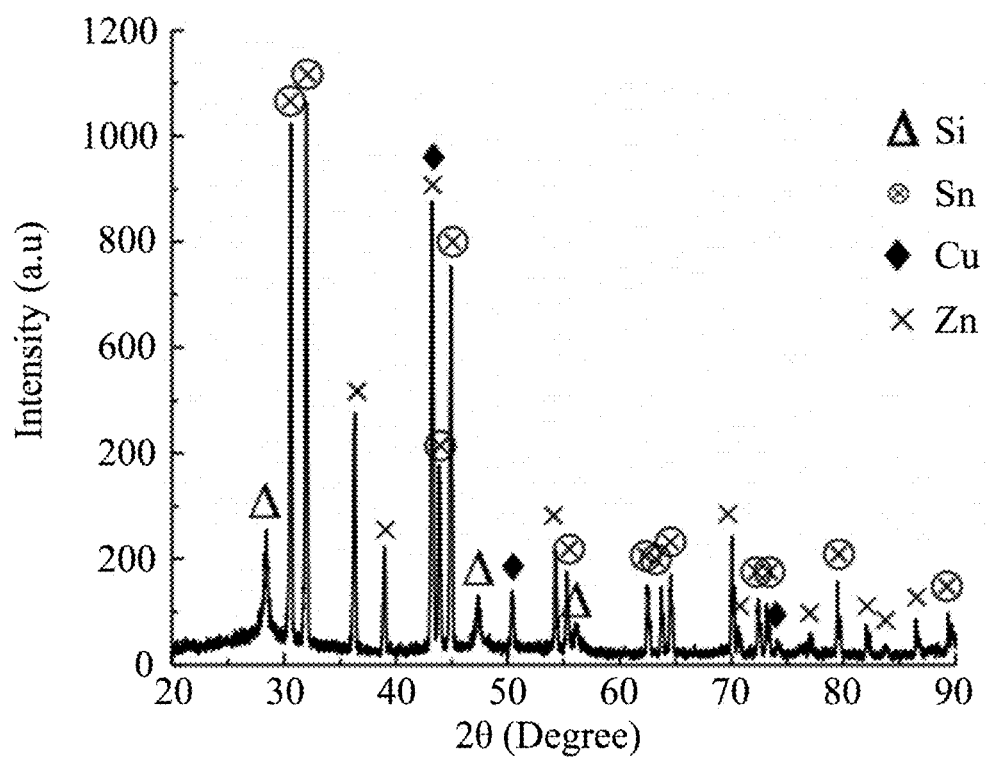
FIG. 2 is an X-ray diffraction pattern of an anode active material of a lithium-ion battery of Comparative Embodiment 1 of the present invention.

Please refer to FIG. 2, which is an X-ray diffraction pattern of an anode active material of a lithium-ion battery of Comparative Embodiment 1 of the present invention. Specifically, in Comparative Embodiment 1, silicon, tin, copper, and zinc in the elemental state were simply mixed, and high-energy ball milling was not performed. Therefore, as can be seen from FIG. 2, copper-zinc alloy is not formed. Accordingly, it was confirmed that the high energy ball milling can be used to form copper-zinc alloy.

In some embodiments of the present invention, a planetary ball mill machine is used for high energy ball milling. During the operation of the planetary ball mill machine, grinding balls moves at high speed in the grinding tank, and the powder is ground by friction force and impact force. Larger particles may be formed from the ground powder by cold welding, which are subsequently crushed by the friction and impact of the grinding balls and repeated. In the grinding tank, activation energy required for alloying is lowered due to grain nanonization. The powder can be more easily alloyed by heat generated by the friction and collision of the grinding balls.

The rotation speed of the high energy ball milling, the size and density of the grinding balls, the weight ratio of the grinding balls to the powder, and the ball milling time all affect the ball milling result of the anode active material. In some embodiments, a ball milling at 400 rpm was used, and zirconium oxide balls with a diameter of 10 mm were used as the grinding balls. The weight ratio of the grinding balls to the powder (silicon powder, tin powder, copper powder and zinc powder, and original sizes of particles are less than 100 μm) is 7.5, and the ball milling time is 4 hours.

The electrical measurements of the present invention are tested using a half cell. A lithium half cell is a commonly used method for electrical evaluation of a material of a lithium battery, in which a test sample is used as a working electrode, and a counter electrode and a reference electrode are lithium metal. Lithium metal was mainly used as a test platform to electrically evaluate the test samples. In some embodiments, charging and discharging are performed in a manner of being assembled into a coin cell.

An anode of a lithium-ion battery includes 76 wt % of an anode active material of the lithium-ion battery, 9 wt % of an adhesive (e.g., polyacrylate), and 15 wt % of a conductive material (e.g., carbon black). First, the anode active material of the lithium-ion battery is mixed with the conductive material using a planetary defoamer at 1500 rpm for 15 minutes. Thereafter, a solvent and the adhesive are added, and mixing was continued using the planetary defoamer at 2000 rpm for 20 minutes. The mixed slurry is applied onto a copper foil, and then dried and rolled to form the anode of the lithium-ion battery.

The anode of the lithium-ion battery is fabricated into a half-cell, and charging and discharging cycles are performed at a current density of 500 mAh/g, in which a voltage range is limited to 0.005 V to 1.5 V.

Table 1 shows respective component ratios and experimental data of Embodiment 1 and Comparative Embodiments of the present invention. The high energy ball milling method for mixing was used in both Embodiment 1 and Comparative Embodiments 2-5, while the high energy ball milling method for mixing was not used in Comparative Embodiment 1. The specific capacitance is the specific capacitance of the first charging, and the first coulombic efficiency is the coulombic efficiency of the first charging and discharging cycle. Coulombic efficiency refers to a ratio of a discharge capacitance of the battery to a charge capacitance during the same cycle, that is, the percentage of the discharge capacitance to the charge capacitance.

TABLE 1

| Element | Molar ratio (at. %) | | | | | Specific capacitance (mAh/g) | First coulombic efficiency (%) |
| --- | --- | --- | --- | --- | --- | --- | --- |
| | Si | Sn | Cu | Zn | Ni | | |
| Embodiment 1 | 65 | 15 | 10 | 10 | — | 1665 | 89 |
| Comparative Embodiment 1 | 65 | 15 | 10 | 10 | — | 1628 | 69 |
| Comparative Embodiment 2 | 65 | — | 10 | 10 | 15 | 1442 | 87 |
| Comparative Embodiment 3 | 65 | 15 | 20 | — | — | 1556 | 86 |
| Comparative Embodiment 4 | 65 | 15 | — | 10 | 10 | 1504 | 87 |
| Comparative Embodiment 5 | 60 | — | 20 | 20 | — | 1472 | 88 |

As can be seen from Table 1, the specific capacitance of Embodiment 1 was significantly better than those of Comparative Embodiments 2-5, and the first coulombic efficiency of Embodiment 1 was also superior to those of Comparative Embodiments. Further, although the specific capacitance of Comparative Embodiment 1 which was not subjected to high energy ball milling was similar to that of Embodiment 1, the first coulombic efficiency of Comparative Embodiment 1 was much lower than that of Embodiment 1. In summary, it can be known that formation of copper-zinc alloy can indeed increase the specific capacitance and the first coulombic efficiency.

Figure 3:
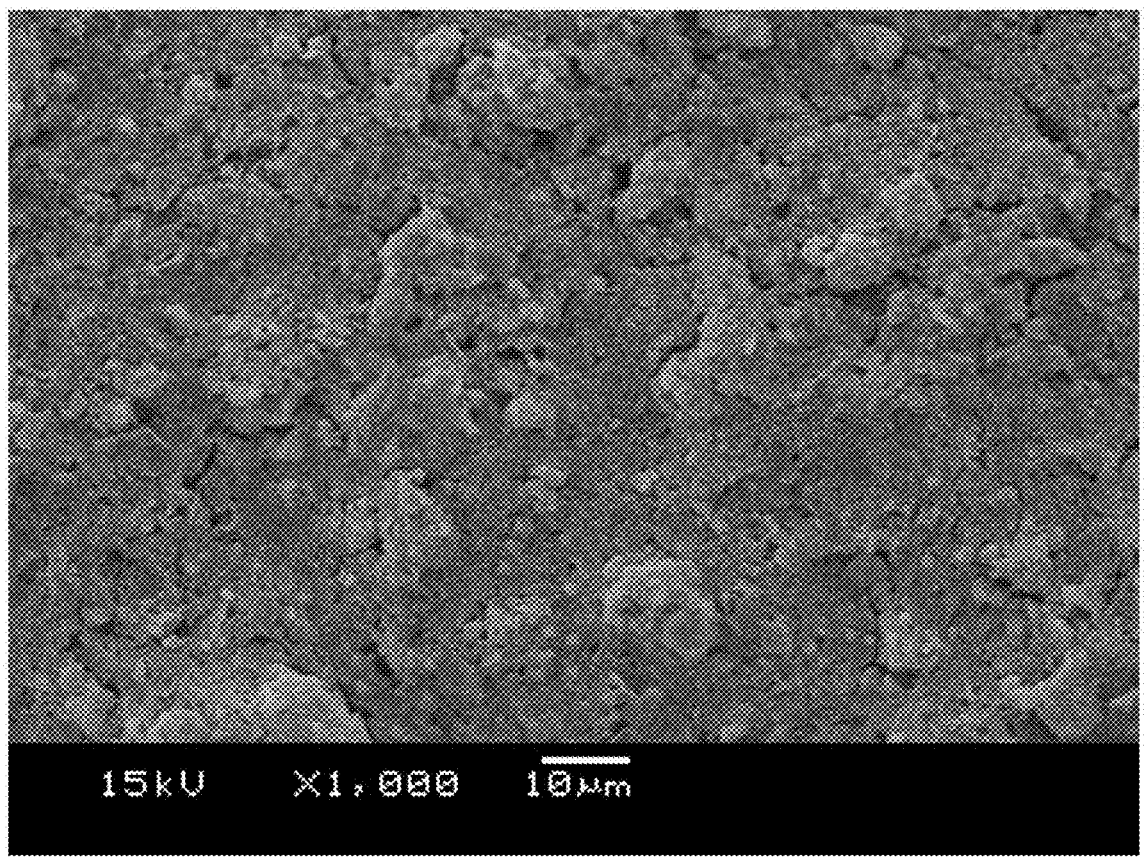
FIG. 3 is a scanning electron microscope (SEM) photograph showing an initial surface of the anode of the lithium-ion battery of Embodiment 1.
Figure 4:
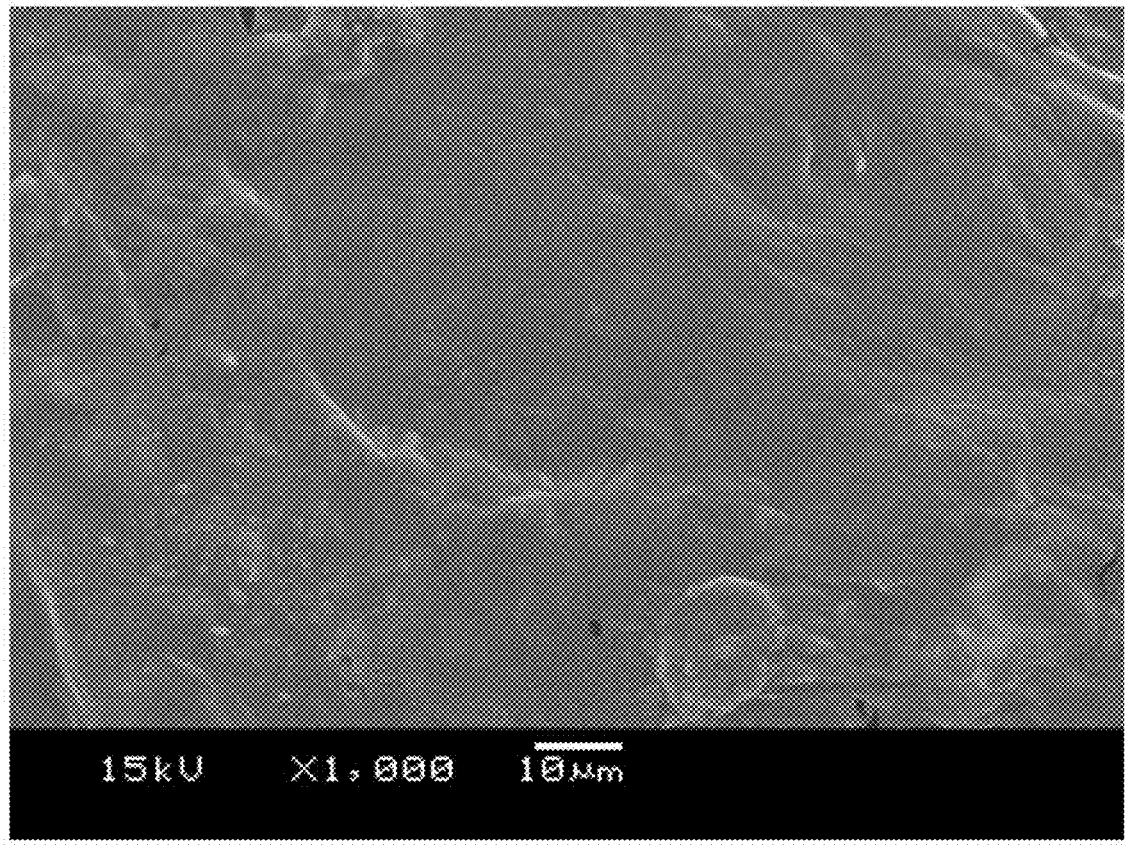
FIG. 4 is a scanning electron microscope photograph showing the surface of the anode of the lithium-ion battery of Embodiment 1 after 50 cycles.

FIG. 3 is a scanning electron microscope (SEM) photograph of an initial surface of the anode of the lithium-ion battery of Embodiment 1. FIG. 4 is a scanning electron microscope photograph of the surface of the anode of the lithium-ion battery of Embodiment 1 after 50 cycles. Please refer to FIG. 3 and FIG. 4 at the same time. It can be found that the surface of the anode of the lithium-ion battery of Embodiment 1 was still very flat after multiple cycles, which means that a solid electrolyte interphase (SEI) membrane formed on the surface of the anode during charging and discharging remained intact after multiple cycles. The intact solid electrolyte interphase membrane can significantly increase the cycle life of the lithium-ion battery.

Figure 5:
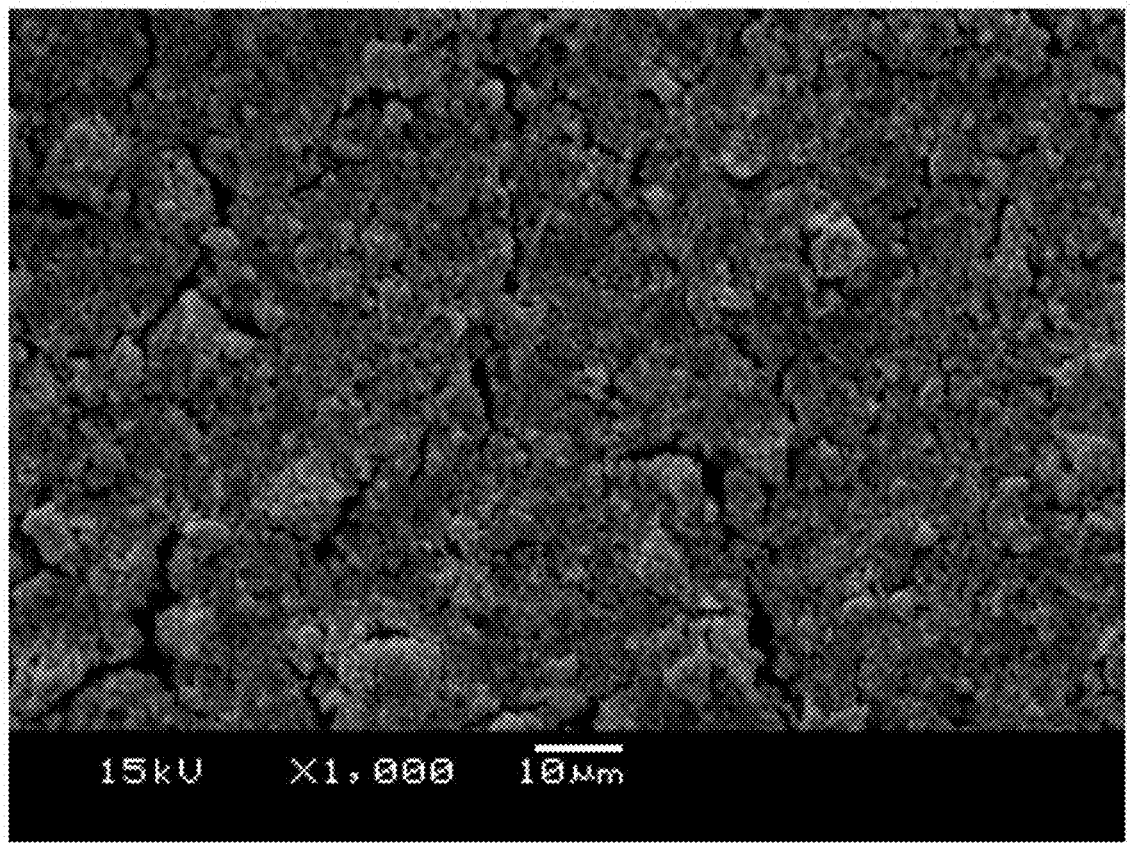
FIG. 5 is a scanning electron microscope photograph showing an initial surface of an anode of a lithium-ion battery of Comparative Embodiment 2.
Figure 6:
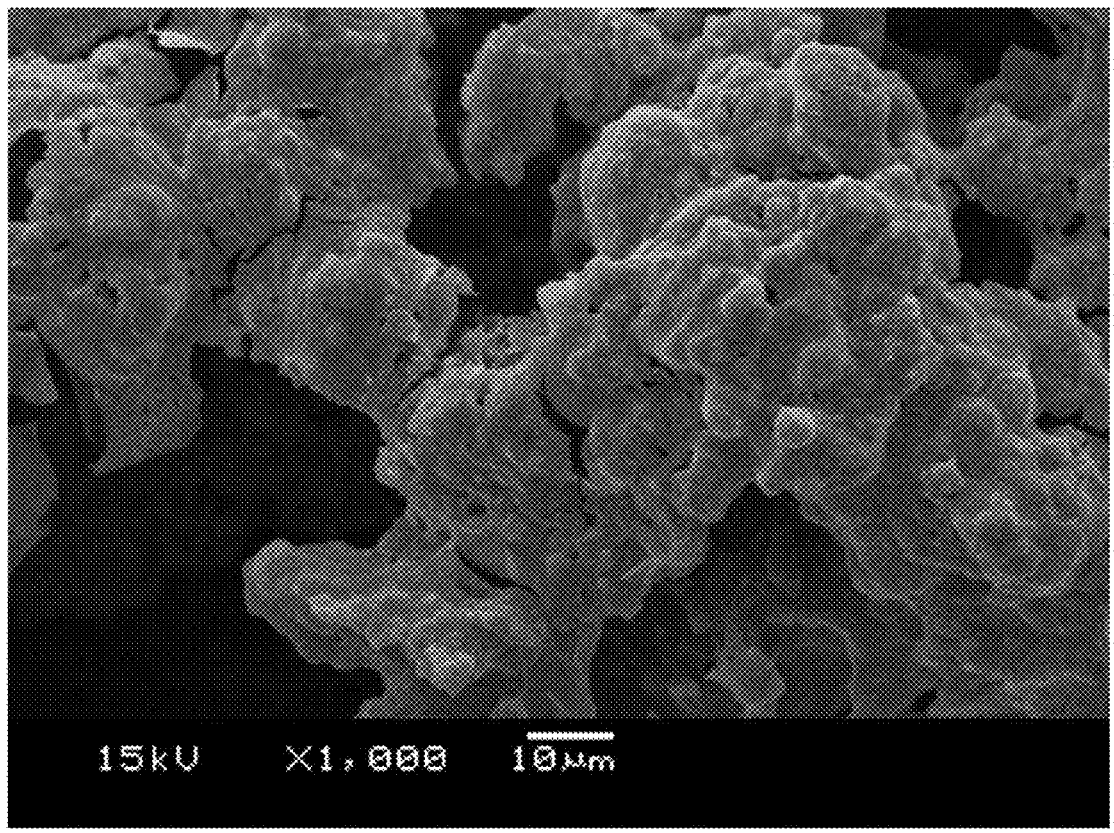
FIG. 6 is a scanning electron microscope photograph showing the surface of the anode of the lithium-ion battery of Comparative Embodiment 2 after 50 cycles.

FIG. 5 is a scanning electron microscope photograph of an initial surface of the anode of the lithium-ion battery of Comparative Embodiment 2. FIG. 6 is a scanning electron microscope photograph of the surface of the anode of the lithium-ion battery of Comparative Embodiment 2 after 50 cycles. Please refer to FIG. 5 and FIG. 6 at the same time. After multiple cycles, the surface of the anode of the lithium-ion battery of Comparative Embodiment 2 was seriously damaged. Since volume change of silicon during charging and discharging was large, and there was no tin in the elemental state used in Comparative Embodiment 2 as a buffer for volume change, the solid electrolyte interphase membrane formed on the surface of the anode was damaged, and the solid electrolyte interphase membranes were repeatedly formed during the multiple cycles. Excessive formation of the solid electrolyte interphase membranes consumes too much lithium ions, resulting in reduced capacity and reduced cycle life of the lithium-ion battery.

Figure 7:
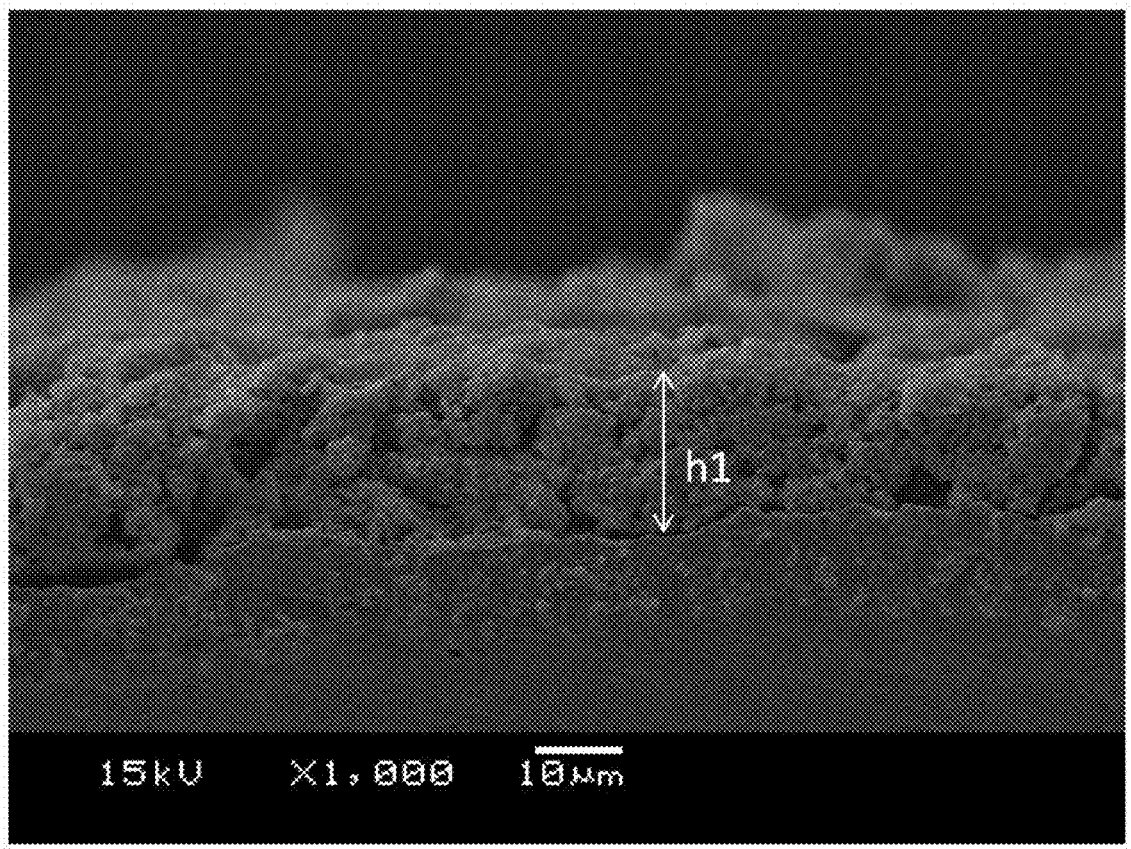
FIG. 7 is a scanning electron microscope photograph showing a cross section of the anode of the lithium-ion battery of Embodiment 1 after 50 cycles.

FIG. 7 is a scanning electron microscope photograph of a cross section of the anode of the lithium-ion battery of Embodiment 1 after 50 cycles. As shown in FIG. 7, a thickness h1 of the fully charged anode of the lithium-ion battery was about 17.5 μm. An expansion ratio of Embodiment 1 was about 175% compared to an initial thickness of about 10 μm.

Figure 8:
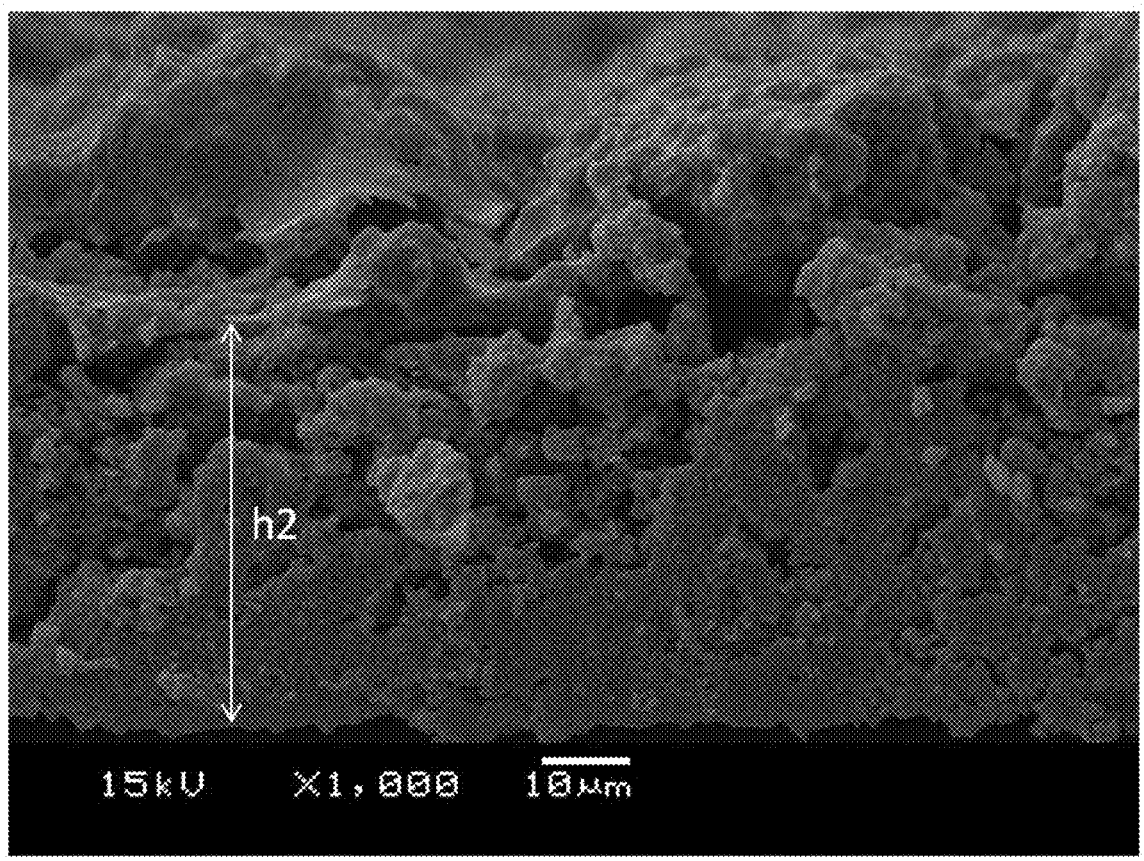
FIG. 8 is a scanning electron microscope photograph showing a cross section of the anode of the lithium-ion battery of Comparative Embodiment 2 after 50 cycles.

FIG. 8 is a scanning electron microscope photograph of a cross section of the anode of the lithium-ion battery of Comparative Embodiment 2 after 50 cycles. A thickness h2 of the fully charged anode of the lithium-ion battery of Comparative Embodiment 2 was about 47.5 μm. An expansion ratio of Comparative Embodiment 2 was about 365% compared to an initial thickness of about 13 μm.

Therefore, it can be seen from the results of FIGS. 7 and 8 that tin of the present invention was substantially in the elemental state, it was possible to surely suppress the degree of expansion of the anode of the lithium-ion battery during charging and discharging.

Table 2 shows respective component ratios and experimental data of Embodiments of the present invention. As mentioned above, the specific capacitance is the specific capacitance of the first charging, and the first coulombic efficiency is the coulombic efficiency of the first charging and discharging cycle.

TABLE 2

| Element | Molar ratio (at. %) | | | | Specific capacitance (mAh/g) | First coulombic efficiency (%) | Phase of copper-zinc alloy |
| --- | --- | --- | --- | --- | --- | --- | --- |
| | Si | Sn | Cu | Zn | | | |
| Embodiment 1 | 65 | 15 | 10 | 10 | 1665 | 89 | β' phase |
| Embodiment 2 | 75 | 5 | 5 | 15 | 1829 | 85 | β' + γ phase |
| Embodiment 3 | 80 | 10 | 5 | 5 | 2123 | 89 | β' phase |
| Embodiment 4 | 85 | 5 | 5 | 5 | 2379 | 88 | β' phase |
| Embodiment 5 | 90 | 4 | 3 | 3 | 2547 | 85 | β' phase |
| Embodiment 6 | 63 | 16 | 5 | 16 | 1657 | 90 | β' phase |
| Embodiment 7 | 73 | 8 | 5 | 14 | 1872 | 88 | β' + γ phase |

As can be seen from Table 2, each of Embodiments of the present invention had excellent specific capacitance, and the first coulombic efficiency could be maintained more than or equal to 85%. In Embodiment 1, Embodiment 3, Embodiment 4, Embodiment 6 and Embodiment 7, the first coulombic efficiency could be more than or equal to 88%. In addition, the specific capacitance of each Embodiment could also reach 1600 mAh/g or more. According to the adjustment of the ratio of silicon to tin, the specific capacitance of Embodiment 5 could even reach 2500 mAh/g or more.

The present invention provides the anode active material of the lithium-ion battery, which greatly improves the influence of the volume change of the silicon material on the electrode structure during charging and discharging by tin in the elemental state. It can be seen from the scanning electron microscope photograph that the electrode surface of the present invention remained flat after cycles, and the solid electrolyte interphase membrane is prevented from being broken, thereby increasing the cycle life of the lithium-ion battery. In addition, the first coulombic efficiency of the present invention can reach nearly 90%, and the specific capacitance can reach 2500 mAh/g or more.

The present invention has described certain embodiments in detail, but other embodiments are also possible. Therefore, the spirit and scope of the appended claims should not be limited to the embodiments described herein.

Although the invention has been disclosed in the above embodiments, it is not intended to limit the invention, and it may be altered or modified without departing from the spirit and scope of the invention. The scope of protection shall be subject to the definition of the scope of the present disclosure attached.

What is claimed is:

1. An anode active material for a lithium-ion battery comprising silicon, tin, and copper-zinc alloy, wherein the tin is substantially in an elemental state and does not form an alloy.

2. The anode active material for the lithium-ion battery of claim 1, wherein based on a total moles of silicon, tin, copper, and zinc, a molar ratio of silicon is in a range of from 45% to 90%, a molar ratio of tin is in a range of from 4% to 45%, a molar ratio of copper is in a range of from 3% to 20%, and a molar ratio of zinc is in a range of from 3% to 20%.

3. The anode active material for the lithium-ion battery of claim 1, wherein the anode active material excludes tin alloy.

4. The anode active material for the lithium-ion battery of claim 1, wherein the anode active material excludes copper-tin alloy.

5. The anode active material for the lithium-ion battery of claim 1, wherein a specific surface area of the anode active material is less than 10 m$^2$/g.

6. The anode active material for the lithium-ion battery of claim 1, wherein the copper-zinc alloy comprises at least one alloy phase of β phase, β' phase, γ phase, ε phase, β+γ phase, β'+γ phase, and ε+γ phase.

7. The anode active material for the lithium-ion battery of claim 1, wherein an atomic ratio of zinc (Zn) to copper (Cu) in the copper-zinc alloy is in a range of from 1.03 to 4.

8. The anode active material for the lithium-ion battery of claim 1, wherein the anode active material has a secondary particle size in a range of from 2 to 10 µm.

9. An anode of a lithium-ion battery, comprising:
the anode active material for the lithium-ion battery of claim 1.

10. The anode of the lithium-ion battery of claim 9, further comprising:
a conductive material; and
an adhesive.

11. The anode of the lithium-ion battery of claim 10, wherein the adhesive comprises at least one polymer, copolymer or mixture of polyvinylidene difluoride (PVDF), styrene-butadiene rubber latex (SBR), carboxymethyl cellulose (CMC), polyacrylate (PAA), polyacrylonitrile (PAN), polyvinyl alcohol (PVA) and sodium alginate.

12. A lithium-ion battery, comprising:
the anode of the lithium-ion battery of claim 9.

13. The lithium-ion battery of claim 12, further comprising:
a cathode of the lithium-ion battery; and
an electrolyte disposed between the anode of the lithium-ion battery and the cathode of the lithium-ion battery.

* * * * *